(12) United States Patent
Takase

(10) Patent No.: US 6,676,267 B2
(45) Date of Patent: Jan. 13, 2004

(54) MIRROR SUPPORT STRUCTURE

(75) Inventor: Yoshiyuki Takase, Oyama (JP)

(73) Assignee: Fuji Photo Optical Co., LTD, Saitama (JP)

( * ) Notice: Subject to any disclaimer, the term of this patent is extended or adjusted under 35 U.S.C. 154(b) by 0 days.

(21) Appl. No.: 10/331,546

(22) Filed: Dec. 31, 2002

(65) Prior Publication Data
US 2003/0137708 A1 Jul. 24, 2003

(30) Foreign Application Priority Data
Jan. 22, 2002 (JP) .......................................... 2002-012455

(51) Int. Cl.[7] .............................................. G02B 7/182
(52) U.S. Cl. ....................... 359/872; 359/871; 359/876; 359/877
(58) Field of Search ................. 359/872, 871, 359/876, 877, 878, 879, 881, 845, 847, 849; 248/476, 477, 478; 372/107, 108, 98

(56) References Cited
U.S. PATENT DOCUMENTS
5,671,244 A * 9/1997 Reeder ....................... 372/107
5,865,415 A * 2/1999 Hoernig ..................... 248/486
6,183,142 B1 * 2/2001 Sakamoto et al. .......... 396/358

FOREIGN PATENT DOCUMENTS
JP H11-281876 10/1999

* cited by examiner

Primary Examiner—Mohammad Sikder
(74) Attorney, Agent, or Firm—Arnold International; Bruce Y. Arnold

(57) ABSTRACT

A mirror support structure includes a mirror holder and a detachably attachable single unit which, when attached to the mirror holder after a mirror has been inserted in the mirror holder, applies bias forces to the mirror. The bias forces are applied so as to press against a front surface of the mirror in the vicinities of the two fixed points and the adjustable point, which tilts the mirror, so that the back surface of the mirror touches the two fixed points and the adjustable point. The single unit includes flexible parts, which apply bias forces to the front surface of the mirror in the vicinities of the two fixed points, and a flexible part which applies a bias force, that is less than the bias forces applied in the vicinities of the two fixed points, to the front surface of the mirror in the vicinity of the adjustable point.

6 Claims, 3 Drawing Sheets

MIRROR SUPPORT STRUCTURE

BACKGROUND OF THE INVENTION

In many cases, the optical systems used in laser beam scanning copying instruments, imaging instruments, such as printers and the like, and projectors, such as liquid crystal projectors, have mirrors in order to re-direct the optical path of light beams. Some such mirrors are able to adjust their tilt angles to reflect light at different angles, and such adjustment mechanisms are disclosed in Japanese Laid-Open Patent Application No. H11-281876. In this publication, the lower, fixed end of the minor sits on a support and is pressed by a lower leaf spring against a mid-support which supports the back of the mirror near its lower edge. And at the same time, the upper edge of the mirror is pressed by two upper leaf springs against respective mirror adjustment brackets which support the back of the mirror near the mirror's left and right edges. By adjustment of the mirror adjustment brackets, the mirror can be tilted left and right as well as tilted up and down, thus enabling the mirror to be adjusted in two directions by moving the mirror adjustment brackets.

In the adjustment mechanism disclosed in the above publication, one lower leaf spring near the fixed lower edge of the mirror and two upper leaf springs near the adjustable upper edge of the mirror are required as the flexible components. Furthermore, in addition to the above parts, a mirror adjustment bracket and fixing screws are required, which makes the entire mechanism less economical, due to the number of parts required. In addition, in order to adjust the tilt angle of the mirror, the fixing screws need to be loosened and then tightened in order to move the mirror adjustment bracket, which complicates the operation for the adjustment. Furthermore, the tilt angle adjustment of the mirror needs to be accomplished after the mirror and the other support parts are directly attached to the steel case, which is not a particularly efficient production method.

BRIEF SUMMARY OF THE INVENTION

The present invention relates to a mirror support structure that enables simpler adjusting of the mirror orientation in an optical system. The mirror support structure of the present invention also has fewer parts than prior art mirror support structures in order to reduce production costs, and its design enables mirror adjustment to be accomplished at the same time that the parts are assembled, thereby improving integrated production efficiency.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
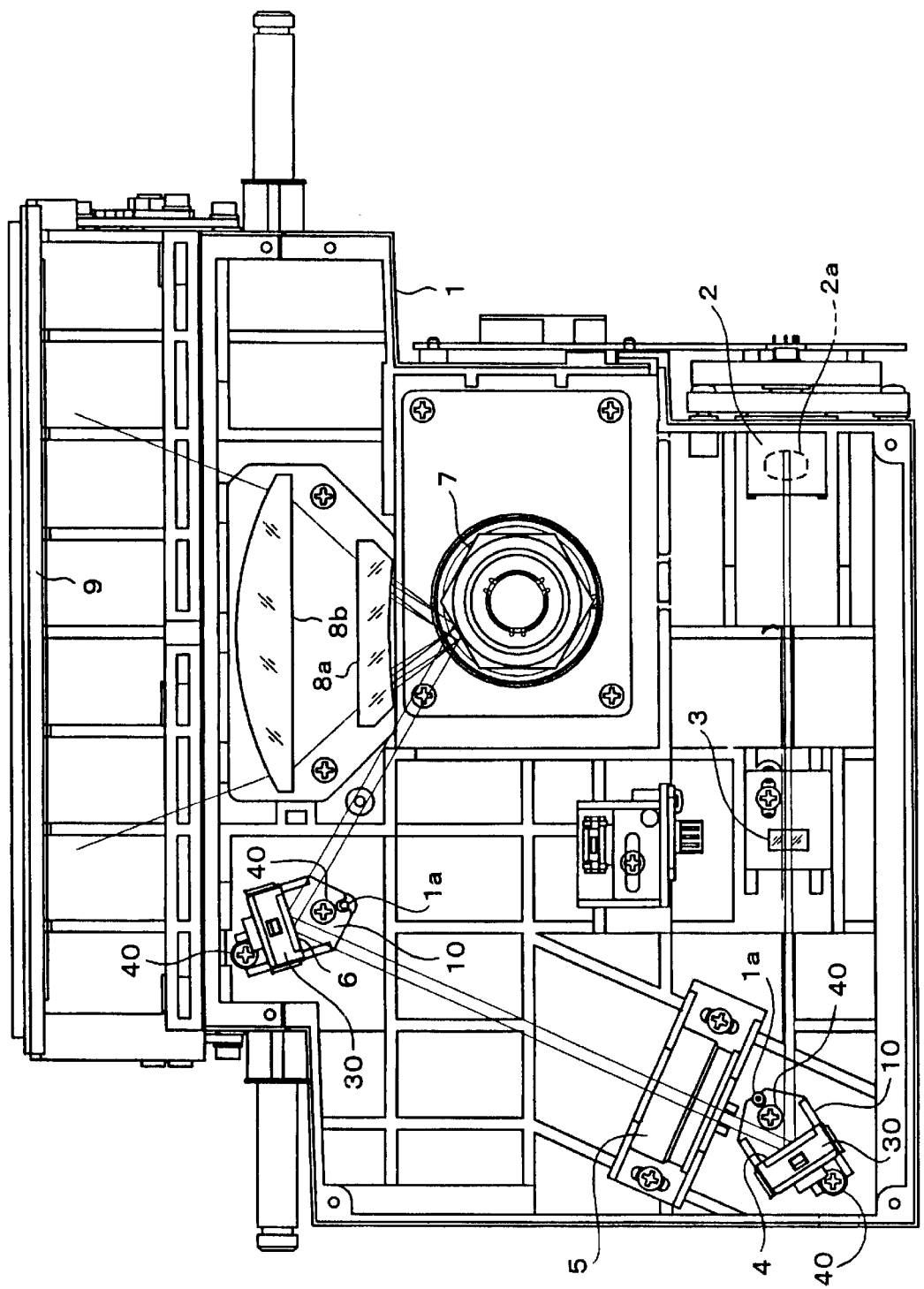
FIG. 1 is a plan view of a laser scanning optical system, equipped with a mirror support structure in accordance with an embodiment of the present invention.

The present invention relates to a mirror support structure for use in an optical system. The mirror support structure includes a mirror holder having two fixed points that secure the mirror near its left and right sides adjacent a lower edge of the mirror, and one adjustment point for securing a tiltable edge of the mirror in order to adjust the tilt angle of the mirror, and a moveable component. The moveable component presses the mirror against each of the two fixed points and the one adjustment point. The moveable component includes both a strong flexible spring which is pressed against the mirror holder in order to secure the mirror near its lower edge so as to abut the mirror against each of the fixed points, and a weak flexible spring which is pressed against the mirror holder near the tiltable edge of the mirror in order to secure the mirror near its top so as to press the mirror against the adjusting point.

In the present invention, a condition is maintained wherein a lower portion of the mirror is secured to the two fixed points of the mirror holder, and an upper portion of the mirror is secured to the adjustment point of the mirror holder. More specifically, the mirror is secured at three points by the mirror holder, in order to increase the stability of the tilt angle adjustment of the mirror. The tilt angle adjustment of the mirror is simply achieved by moving the tilted end of the mirror back and forth via the adjustment point. In adjusting the tilt angle in order to tilt the mirror, the force of a weak flexible component of a leaf spring unit is used, with the leaf spring unit including both a strong flexible component and a weak flexible component. The force of the weak flexible component of the leaf spring unit is sufficient to tilt the mirror. Conversely, the stronger flexible component of the leaf spring unit, which secures the mirror so that it abuts the two fixed points, has less flexibility, and therefore, the fixed edge of the mirror remains tightly secured, while still allowing the tilt angle adjustment of the mirror to be performed.

The present invention also requires fewer parts than previously required to hold a mirror in an adjustable manner. These parts are: the mirror holder, the leaf spring unit, and a single adjustment screw, resulting in lower production costs. Furthermore, as these component parts represent a complete assembly unit, this allows the manufacturer to build an entire optical system, such as a housing and mirror support assembly that allows the mirror to have its tilt angle adjusted, in a single assembly process. Thus efficiency of production is increased.

The adjustment point of the mirror holder in the present invention can be the tip of a screw that is attached to the mirror holder, with the tip being movable in and out. In this case, the back of the mirror near the tiltable edge of the mirror abuts the tip of the screw, and the tilt angle of the mirror is adjusted by simply rotating the screw. The mirror is biased against the two fixed points and the adjustment point by the leaf spring unit.

In addition, it is preferable that the moveable parts of the present invention be made of a single leaf spring unit in order to simplify the production process. The leaf spring unit is made so as to have both a strong spring component and a weak spring component.

An embodiment of the present invention will now be described with reference to the drawing figures.

FIG. 1 shows a laser scanning optical system of a full-color imaging system within, for example, a plastic housing 1. According to this optical system, a laser light source 2 includes a first lens 2a The light from the laser is modulated with image information for producing a full-color image, such as with signals for Y (yellow), M (magenta), C (cyan) as well as BK (black, i.e., no signal). The laser beam is transmitted through a second lens 3, is reflected by a first mirror 4 and is then transmitted through a third lens 5. After being reflected by a second mirror 6, the laser beam is incident onto the rotating multiple mirrors 7. After being reflected by the rotating multiple mirrors 7, the laser beam is transmitted through f·θ lenses 8a and 8b so as to enter a 3-color separation prism 9. The laser beam entering into the 3-color separation prism 9 is then split by reflection into three beams of different colors, such as Y, M and C so as to be modulated with image information for that color and to be projected via a mirror and lens (not illustrated) to an image-plane so as to form a full-color image.

Figure 2:
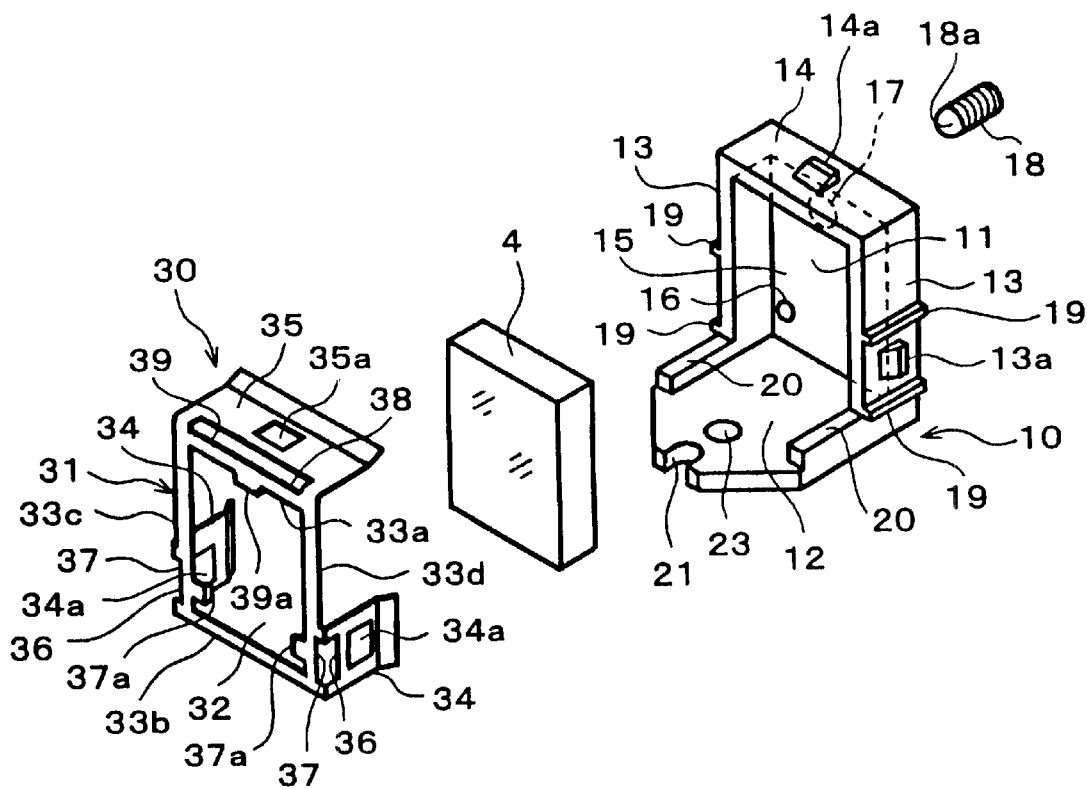
FIG. 2 is an exploded perspective view of the mirror support structure shown in FIG. 1.
Figure 3:
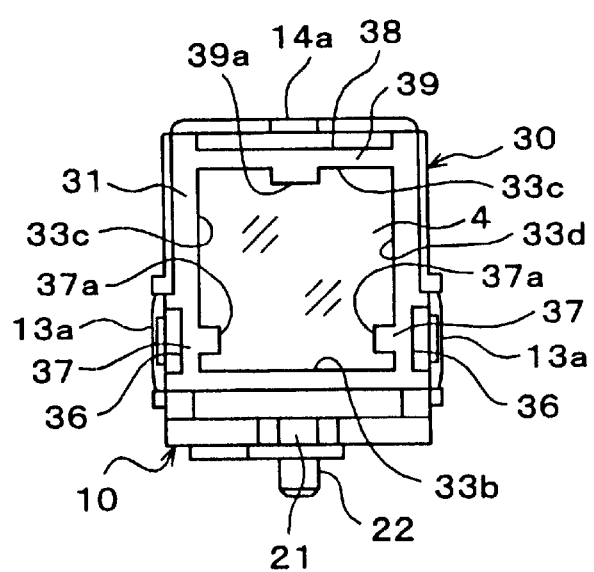
FIG. 3 is a front view of the mirror support structure shown in FIG. 1, with the mirror being secured by a mirror holder and a leaf spring.
Figure 4:
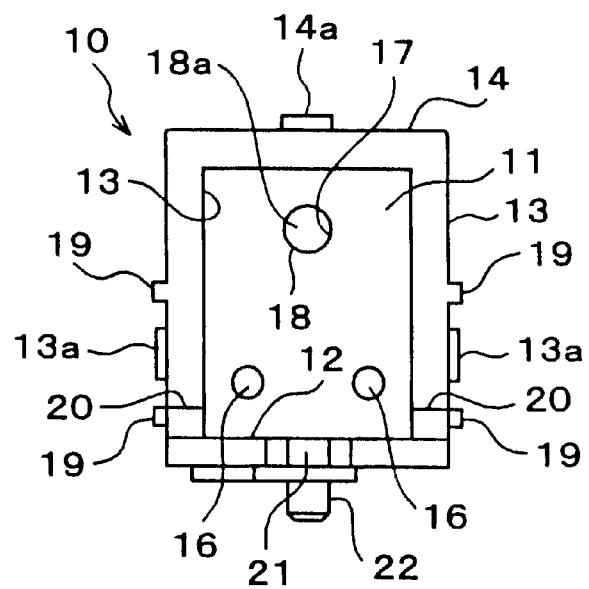
FIG. 4 is a front view of the mirror holder.
Figure 5:
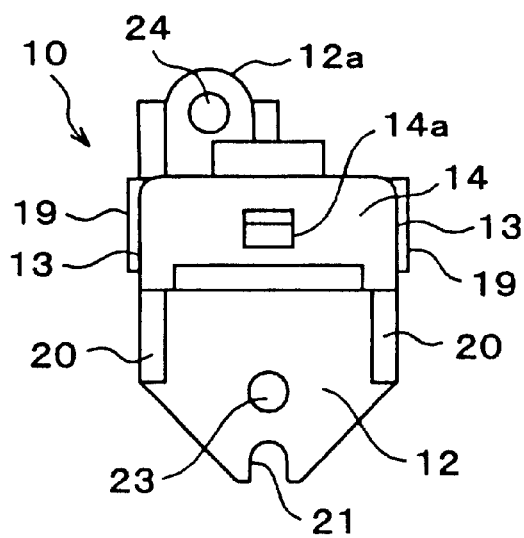
FIG. 5 is a plan view of the mirror holder.

FIG. 2 shows, for example, the support structure for a first mirror 4. A similar support structure is provided for the second mirror 6. A mirror holder 10 supports the mirror 4 as well as the leaf spring unit 30. FIG. 3 shows the front view of the assembled structure, and FIGS. 4 and 5 show the front view and the plan view, respectively, of the mirror holder 10. As best shown in FIG. 3, the mirror 4 is rectangular in shape, with a certain thickness, and is held in the mirror holder 10 with its longer side in an upright position.

The mirror holder 10 has a recessed region 11 within which the mirror 4 is placed. The recessed region 11 is formed of a base plate 12, left and right side walls 13, 13 an upper plate 14, and a back plate 15. As shown in FIG. 4, a pair of projections 16, 16 on the left and right sides is formed on the front lower portion of the back plate 15 of the mirror holder 10. In addition, a screw hole 17 is formed in the central region of the upper portion of the back plate 15, and an adjustment screw 18, having a rounded tip 18a, is screwed into the screw hole 17 from the back side of the back plate 15, and the depth of that projection changes when the screw is rotated. The two projections 16, 16 and the adjustment screw 18 are arranged in the form of an isosceles triangle. Catching tabs 13a, 13a are formed as illustrated on the lower portion of the left and right side walls 13, 13. Also, a catching tab 14a is formed as illustrated on the upper plate 14. Guiding curbs 19, 19 extend in the horizontal direction above and below the catching tabs 13a, 13a so as to guide a leaf spring unit 30 so that the cutouts 34a, 34a at the sides of the leaf spring unit fit over the catching tabs.

As best shown in FIGS. 2 and 5, the front portion of the base plate 12 has a triangular shape, and a U-shaped groove 21 is formed at the tip of the triangle in order to help assemble the base plate 12 to the housing 1. In addition, as shown in FIG. 4, a short rod-shaped projection 22 is formed on the central region of the bottom side of the base plate 12 in order to help assemble the base plate 12 to the housing 1. As shown in FIG. 5, on the back side of the back plate 15, an extended part 12a projects from the base plate 12, and a hole 24 is formed therein for fixing the base plate to the housing 1.

A leaf spring unit 30 is punched and bent from a single steel plate, as shown in FIGS. 2 and 3. It has a rectangular-shaped rim 31 along the outer edge of the mirror 4, and a cutout inside the rim 31 serves as an aperture 32 to allow a laser beam to pass through. The rim 31 consists of left, right, upper and lower peripheral parts 33a, 33b, 33c, and 33d. Lower catching pieces 34, 34, which extend from the lower end of the left and right side peripheral parts 33c and 33d, detachably attach to the left and right side walls 13, 13 of the mirror holder 10, and an upper catching piece 35 that extends back from the upper peripheral part 33a detachably attaches to the upper plate 14 of the mirror holder 10.

In the center of the lower catching pieces 34, 34 catching holes 34a, 34a are formed that are designed to receive matching catching tabs 13a, 13a of the left and right side walls 13, 13 of the mirror holder 10. In the center of the upper catching piece 35, a catching hole 35a is formed that is designed to receive a matching catching tab 14a of the upper plate 14 of the mirror holder 10. The catching pieces 34, 34, and 35 are slid backward to "catch" the catching tabs 13a, 13a and 14a within the catching holes 34a, 34a and 35a, respectively. In this manner a mirror, such as the mirror 4, may be secured to the mirror holder 10 using a leaf spring unit 30 in a detachable manner. When loading the leaf spring unit 30 to the mirror holder 10, the left and right lower catching pieces 34, 34 are individually pushed onto the mirror holder 10, in order to fit inside the guiding curbs 19, 19. The tips of each of the catching pieces 34, 34 and 35 are bent outward so as to more easily slide along ramp surfaces of the catching tabs 13a, 13a and 14a, making it easier to engage the leaf spring unit 30 to the mirror holder 10.

In addition, cutout portions 36, 36 are formed on the left and right peripheral parts 33c and 33d, and a cutout portion 38 is formed on the upper peripheral part 33a. Two strong spring components 37, 37 and a weak spring component 39 are thus formed. The weak spring component 39 is approximately three times longer than the two strong spring components 37, 37 and thus has much greater flexibility. Each of the two strong spring components 37, 37 and the weak spring component 39 has pushing elements 37a, 37a and 39a, which are L-shaped in cross-section and bent inward so as to apply bias forces to the mirror 4.

To attach the mirror 4 to the mirror holder 10, the base plate 12 of the mirror holder 10 is positioned next to the mirror 4. The guiding curbs 20, 20 on both sides of the base plate 12 of the mirror holder 10 guide the mirror into the recess. Next, the left and right lower catching pieces 34, 34 of the leaf spring unit 30 are positioned in relation to the mirror holder 10 in order to fit inside the guiding curbs 19, 19 which are positioned on each side wall 13, 13 of the mirror holder 10. Then, the leaf spring unit 30 is pushed onto the sides of the mirror holder 10 to "catch" the catching holes 34a, 34a of the left and right catching pieces 34, 34 so as to engage the catching tabs 13a, 13a on each side wall 13, 13, and to "catch" the catching hole 35a of the upper catching piece 35 so as to engage the catching tab 14a of the upper plate 14. In this manner, the mirror 4 is pressed against the mirror holder 10 by each of the pushing elements 37a, 37a and 39a of the leaf spring unit 30. As shown in FIG. 1, the plastic housing 1 includes positioning projections 1a, 1a for positioning the mirror holders 10. The U-shaped groove 21 of each mirror holder 10 is pressed against a positioning projection 1a, and the positioning projection 22 of the mirror holders 10, 10 is inserted into a positioning hole (not illustrated) in the plastic housing 1. Then, two screws 40, 40 are passed through the holes 23 and 24 at the front and back of the base plate 12 of the mirror holder 10 and tightened so as to secure the mirror holder 10 to the plastic housing 1.

The operation of the above-mentioned embodiment will now be described.

The leaf spring unit 30 is pressed against the mirror 4. The mirror then touches the two fixed points which are the projections 16, 16 near the bottom of the mirror. At the upper portion of the mirror, the mirror touches the adjustment point, i.e., the tip 18a of an adjustment screw 18. In short, the mirror 4 is secured at three points to increase its stability.

The adjustment of the tilt angle of a mirror 4 is achieved by rotating the adjustment screw 18 to change the depth of the projection at the front side of the back plate 15 of the mirror holder 10. In short, the clockwise rotation of the adjustment screw 18 near the upper edge of the mirror results in the mirror 4 being tilted forward because the mirror is pushed by the adjustment screw 18 against the bias force of the weak spring component 39 of the leaf spring unit 30. Conversely, the counter-clockwise rotation of the adjustment screw 18 near the upper edge of the mirror results in the mirror 4 being tilted backward because it is pushed by the weak spring component 39 of the leaf spring unit 30. In this way, the tilt angle of the reflecting mirror 4 is easily adjusted by rotating the adjustment screw 18. The adjustment screw 18 is screwed into a screw hole 17 and its movement in the axial direction changes the tilt angle of the mirror 4.

The bias force of the weak spring component 39 of the leaf spring unit 30 allows the tilt angle of the mirror 4 to be adjusted, because the flexibility of this component is large. On the other hand, the bias force of the strong spring components 37, 37 secures the mirror 4 against the projections 16, 16 near the bottom edge of the mirror 4. Because the strong spring components have less flexibility, the lower edge of the mirror 4 is tightly secured during the tilt angle adjustment while still allowing the mirror to tilt.

According to the present invention, the mirror holder 10, the leaf spring unit 30, and the adjustment screw 18 are the only components needed for supporting the mirror 4 and enabling a tilt adjustment of the mirror to be performed by turning a single adjustment screw, thereby reducing the number of parts and lowering the overall cost of production. Furthermore, as these component parts represent a completed assembly unit, this allows the manufacturer to build an entire optical system in a single assembly process, thereby improving the efficiency of production. In addition, the leaf spring unit 30 can be formed from a single steel plate, which lowers production and assembly costs.

The invention being thus described, it will be obvious that the same may be varied in many ways. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A mirror support structure for supporting a mirror and for enabling the mirror tilt angle to be easily adjusted within an optical system, said mirror support structure comprising:

a mirror holder having two fixed points and one adjustable point, so as to define a plane surface, for abutting the back side of a mirror that is to be held by the mirror holder, with the two fixed points being adjacent a relatively fixed edge of a mirror to be held by the mirror holder, and the one adjustable point being adjacent an edge of said mirror, the one adjustable point being adjustable in position so as to adjust a tilt angle of the mirror relative to the mirror holder; and a single unit that, when attached to the mirror holder after a minor has been inserted in the mirror holder, applies bias forces to said mirror, said bias forces being applied so as to press against a front surface of the mirror in the vicinities of said two fixed points and the adjustable point so that the back surface of the mirror touches the two fixed points and the adjustable point, said single unit including strong flexible parts, which apply bias forces to the front surface of the mirror in the vicinities of the said two fixed points and a weak flexible part, which applies a bias force which is less than the bias force applied by the strong flexible parts, to the front surface of the mirror in the vicinity of the adjustable point.

2. The mirror support structure described in claim 1, wherein the adjustment point is the tip of a screw that is attached to the mirror holder, and, by rotating the screw so that it moves in or out, a tilt angle of the mirror relative to the mirror holder is changed.

3. The mirror support structure of claim 1, wherein said single unit is a leaf spring unit.

4. The mirror support structure of claim 2, wherein said single unit is a leaf spring unit.

5. The mirror support structure of claim 3, wherein the leaf spring unit is detachably attachable to the mirror holder.

6. The mirror support structure of claim 4, wherein the leaf spring unit is detachably attachable to the mirror holder.

* * * * *